US012707528B2

(12) United States Patent
Agiwal

(10) Patent No.: US 12,707,528 B2
(45) Date of Patent: Aug. 11, 2026

(54) METHOD AND APPARATUS FOR UPDATING RNA DURING SDT IN WIRELESS COMMUNICATION SYSTEM

(71) Applicant: Samsung Electronics Co., Ltd., Suwon-si (KR)

(72) Inventor: Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 18/280,519

(22) PCT Filed: Mar. 8, 2022

(86) PCT No.: PCT/KR2022/003296
§ 371 (c)(1),
(2) Date: Sep. 6, 2023

(87) PCT Pub. No.: WO2022/191599
PCT Pub. Date: Sep. 15, 2022

(65) Prior Publication Data

US 2024/0155725 A1 May 9, 2024

(30) Foreign Application Priority Data

Mar. 8, 2021 (KR) ........................ 10-2021-0030239

(51) Int. Cl.
*H04W 76/27* (2018.01)
*H04W 76/38* (2018.01)

(52) U.S. Cl.
CPC ........... *H04W 76/27* (2018.02); *H04W 76/38* (2018.02)

(58) Field of Classification Search
CPC ................................ H04L 12/28; H04L 12/50
(Continued)

(56) References Cited

U.S. PATENT DOCUMENTS 10,582,560 B2 3/2020 Park et al.
10,764,861 B2 9/2020 Ishii
11,882,567 B2 * 1/2024 Agiwal .............. H04W 56/001

FOREIGN PATENT DOCUMENTS

WO 2019216811 A1 11/2019

OTHER PUBLICATIONS

International Search Report and Written Opinion of the International Searching Authority dated Jun. 9, 2023, in connection with International Application No. PCT/KR2022/003296, 9 pages.

(Continued)

*Primary Examiner* — Dang T Ton

(57) ABSTRACT

The disclosure relates to a 5G or 6G communication system for supporting a higher data transmission rate. A method performed by a terminal in a wireless communication system is provided. The method may include: receiving, from a base station, a radio resource control (RRC) release message including a parameter indicating a timer that triggers a radio access network based notification area (RNA) update; transitioning to an RRC inactive state and starting the timer, based on the RRC release message; in case that criteria for small data transmission (SDT) are met while the timer is running, transmitting, to the base station, an RRC resume request message for the SDT, wherein the timer is not stopped when the RRC resume request message is transmitted; and in case that the timer expires while the SDT is ongoing, setting a variable indicating whether the RNA update is pending, to a true value.

13 Claims, 2 Drawing Sheets

(58) Field of Classification Search
USPC ................................ 370/329, 401, 402, 403
See application file for complete search history.

(56) References Cited

OTHER PUBLICATIONS

International Preliminary Report on Patentability dated May 30, 2023, in connection with International Application No. PCT/KR2022/003296, 4 pages.
3GPP TS 38.331 V16.3.1 (Jan. 2021), Technical Specification, 3rd Generation Partnership Project; Technical Specification Group Radio Access Network; NR; Radio Resource Control (RRC) protocol specification (Release 16), Jan. 2021, 932 pages.
Ericsson, "Summary of email discussion [Post111-e][926][SmallData] Context Fetch," R2-2009976, 3GPP TSG-RAN WG2 Meeting #112-e, Electronic meeting, Nov. 2-13, 2020, 22 pages.
Intel Corporation, "SDT mechanism on RRC/non-RRC based approaches and RACH requirements," R2-2006713, 3GPP TSG RAN WG2 Meeting #111-e, Electronic meeting, Aug. 17-28, 2020, 10 pages.
Sony, "Details of RA-based schemes for SDT in NR," R2-2009889, 3GPP TSG-RAN WG2 Meeting #112 electronic, Online, Nov. 2-13, 2020, 4 pages.

* cited by examiner

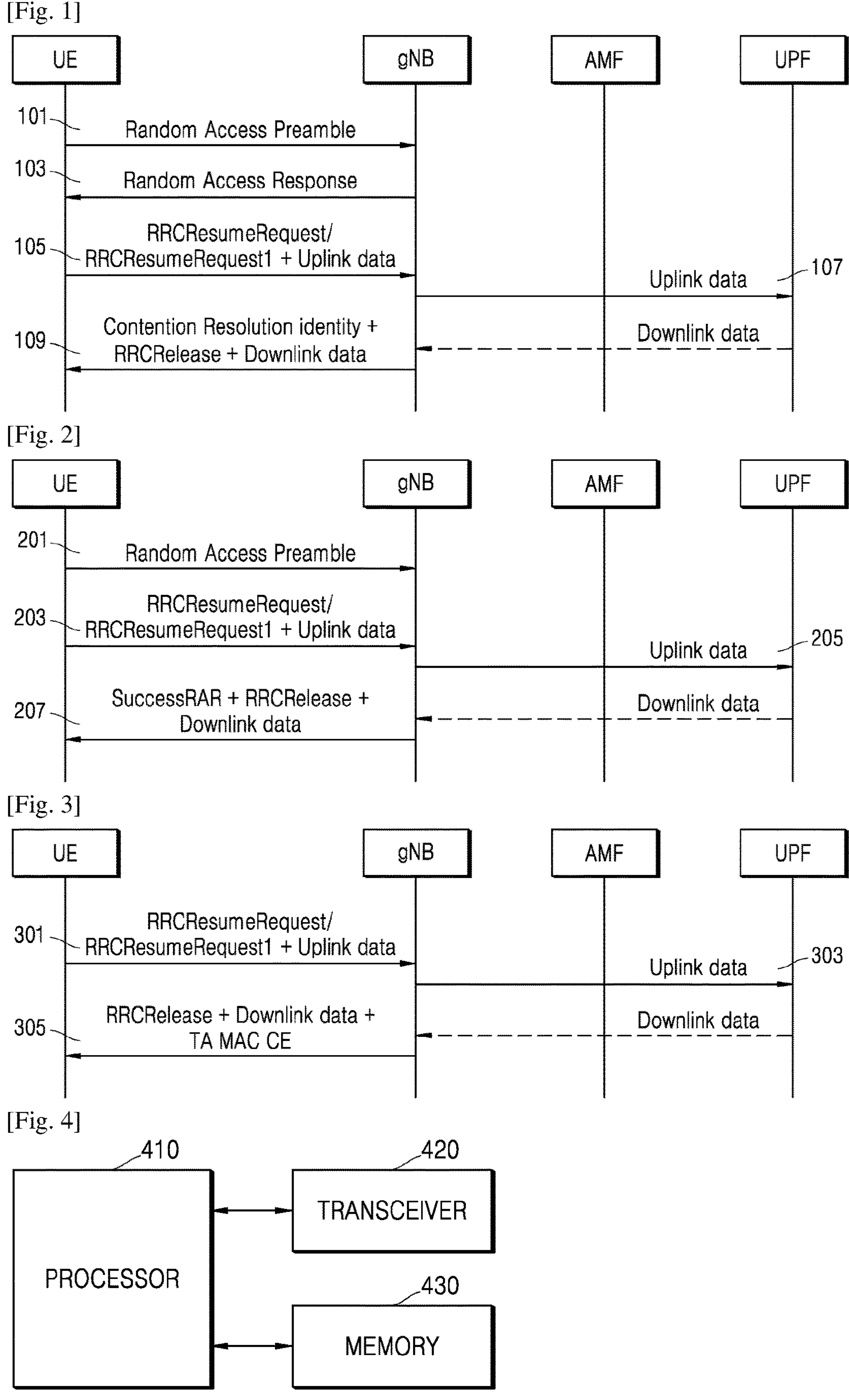
[Fig. 1]
UE
gNB
AMF
UPF
101
Random Access Preamble
103
Random Access Response
105
RRCResumeRequest/
RRCResumeRequest1 + Uplink data
107
Uplink data
109
Contention Resolution identity +
RRCRelease + Downlink data
Downlink data
[Fig. 2]
UE
gNB
AMF
UPF
201
Random Access Preamble
203
RRCResumeRequest/
RRCResumeRequest1 + Uplink data
205
Uplink data
207
SuccessRAR + RRCRelease +
Downlink data
Downlink data
[Fig. 3]
UE
gNB
AMF
UPF
301
RRCResumeRequest/
RRCResumeRequest1 + Uplink data
303
Uplink data
305
RRCRelease + Downlink data +
TA MAC CE
Downlink data
[Fig. 4]
410
PROCESSOR
420
TRANSCEIVER
430
MEMORY

[Fig. 5]
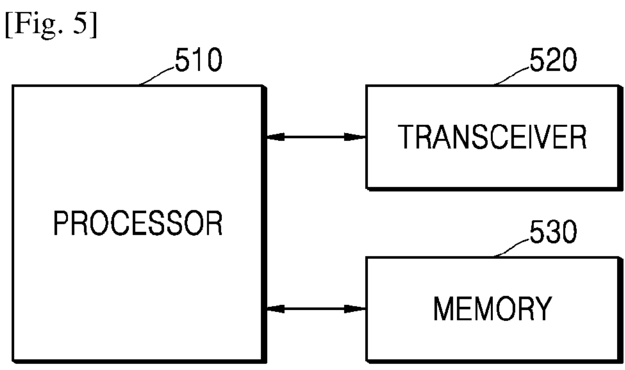

METHOD AND APPARATUS FOR UPDATING RNA DURING SDT IN WIRELESS COMMUNICATION SYSTEM

TECHNICAL FIELD

The disclosure relates to wireless communication systems, and more particularly, to a method and an apparatus for updating RNA (radio access network-based notification area) during SDT (small data transmission) in a wireless communication system.

BACKGROUND ART 5G mobile communication technologies define broad frequency bands such that high transmission rates and new services are possible, and can be implemented not only in “Sub 6 GHz” bands such as 3.5 GHz, but also in “Above 6 GHz” bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultrahigh-performance communication and computing resources.

DISCLOSURE OF INVENTION

Solution to Problem

The disclosure relates to a method and an apparatus for RNA update during SDT in a wireless communication system.

BRIEF DESCRIPTION OF DRAWINGS

The above and other aspects, features, and advantages of certain embodiments of the disclosure will be more apparent from the following description taken in conjunction with the accompanying drawings, in which:

FIG. 1 illustrates a signaling flow for small data transmission using 4 step RA;

FIG. 2 illustrates a signaling flow for small data transmission using 2 step RA;

FIG. 3 illustrates a signaling flow for small data transmission using preconfigured PUSCH resource;

FIG. 4 is a diagram illustrating a UE 400 according to an embodiment of the present disclosure; and FIG. 5 is a diagram illustrating a base station 500 according to an embodiment of the present disclosure.

MODE FOR THE INVENTION

Throughout the disclosure, the expression "at least one of a, b or c" indicates only a, only b, only c, both a and b, both a and c, both b and c, all of a, b, and c, or variations thereof. Throughout the specification, a layer (or a layer apparatus) may also be referred to as an entity. Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s).

The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor. In the following descriptions of the disclosure, well-known functions or configurations are not described in detail because they would obscure the disclosure with unnecessary details.

Hereinafter, for convenience of explanation, the disclosure uses terms and names defined in the 3rd generation partnership project long term evolution (3GPP LTE) standards. However, the disclosure is not limited to the terms and names, and may also be applied to systems following other standards.

In the disclosure, an evolved node B (eNB) may be interchangeably used with a next-generation node B (gNB) for convenience of explanation. That is, a base station (BS) described by an eNB may represent a gNB. In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. However, the disclosure is not limited to the aforementioned examples. In particular, the disclosure is applicable to 3GPP new radio (NR) (or 5th generation (5G)) mobile communication standards. In the following description, the term eNB may be interchangeably used with the term gNB for convenience of explanation. That is, a base station explained as an eNB may also indicate a gNB. The term UE may also indicate a mobile phone, NBIoT devices, sensors, and other wireless communication devices.

In recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system (also referred as next generation radio or NR) is being developed to meet the growing demand for high speed data services by supporting ultra-reliability and low latency applications.

The fifth generation wireless communication system supports not only lower frequency bands but also higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases that the fifth generation wireless communication system is expected to address are enhanced Mobile Broadband (eMBB), massive Machine Type Communication (m-MTC), ultra-reliable low latency communication (URLL) and etc. The eMBB requirements like tens of Gbps data rate, low latency, high mobility and so forth address the market segment representing the conventional wireless broadband subscribers needing internet connectivity everywhere, all the time and on the go. The m-MTC requirements like very high connection density, infrequent data transmission, very long battery life, low mobility address and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (mmWave) bands, UE and gNB communicates with each other using a beamforming. Beamforming techniques are used to mitigate the propagation path losses and to increase the propagation distance for a communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases a directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, and etc. The use of the TX beamforming results in the increase in the directivity of a signal, thereby increasing a propagation distance. Further, since the signal is almost not transmitted in a direction other than a directivity direction, a signal interference acting on another receiving end is significantly decreased.

The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as transmit (TX) beam. A wireless communication system operating at high frequency uses a plurality of narrow TX beams to transmit signals in a cell as each narrow TX beam provides coverage to a part of the cell. The narrower the TX beam, the higher the antenna gain and hence the larger the propagation distance of signal transmitted using beamforming. A receiver can also make a plurality of receive (RX) beam patterns of different directions. Each of these receive patterns can be also referred as receive (RX) beam.

CA/Multi-connectivity in fifth generation wireless communication system: The fifth generation wireless communication system, supports a standalone mode of operation as well as dual connectivity (DC). In DC, multiple Rx/Tx UEs may be configured to utilise resources provided by two different nodes (or NBs) connected via a non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in RRC_CONNECTED is configured to utilise radio resources provided by two distinct schedulers, located in two different nodes connected via a non-ideal backhaul and providing either E-UTRA (i.e. if the node is an ng-eNB) or NR access (i.e. if the node is a gNB).

In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the PCell and optionally one or more SCells. In NR the term Secondary Cell Group (SCG) refers to a group of serving cells associated with the Secondary Node, comprising of the PSCell and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

System information acquisition in fifth generation wireless communication system: In the fifth generation wireless communication system, node B (gNB) or base station in cell broadcast Synchronization Signal and PBCH block (SSB)

consists of primary and secondary synchronization signals (PSS, SSS) and system information. System information includes common parameters needed to communicate in cell. In the fifth generation wireless communication system (also referred as next generation radio or NR), System Information (SI) is divided into the MIB and a number of SIBs where:

- the MIB is always transmitted on the BCH with a periodicity of 80 ms and repetitions made within 80 ms and it includes parameters that are needed to acquire SIB1 from the cell.
- the SIB1 is transmitted on the DL-SCH with a periodicity of 160 ms and variable transmission repetition. The default transmission repetition periodicity of SIB1 is 20 ms but the actual transmission repetition periodicity is up to network implementation. The scheduling information in SIB 1 includes mapping between SIBs and SI messages, periodicity of each SI message and SI window length. The scheduling information in SIB 1 includes an indicator for each SI message, which indicates whether the concerned SI message is being broadcasted or not. If at least one SI message is not being broadcasted, SIB1 may include random access resources (PRACH preamble(s) and PRACH resource(s)) for requesting gNB to broadcast one or more SI message(s).
- SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in SIB 1. The cell specific SIB is applicable only within a cell that provides the SIB while the area specific SIB is applicable within an area referred to as SI area, which consists of one or several cells and is identified by systemInformationAreaID.

PDCCH in fifth generation wireless communication system: In the fifth generation wireless communication system, Physical Downlink Control Channel (PDCCH) is used to schedule DL transmissions on PDSCH and UL transmissions on PUSCH, where the Downlink Control Information (DCI) on PDCCH includes: Downlink assignments containing at least modulation and coding format, resource allocation, and hybrid-ARQ information related to DL-SCH; Uplink scheduling grants containing at least modulation and coding format, resource allocation, and hybrid-ARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the PRB(s) and OFDM symbol(s) where the UE may assume no transmission is intended for the UE; Transmission of TPC commands for PUCCH and PUSCH; Transmission of one or more TPC commands for SRS transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. QPSK modulation is used for PDCCH.

In fifth generation wireless communication system, a list of search space configurations are signaled by GNB for each configured BWP wherein each search configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y\text{*(number of slots in a radio frame)}+x-\text{Monitoring-offset-PDCCH-slot}) \bmod (\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of coreset configuration associated with it. A list of coreset configurations are signaled by GNB for each configured BWP wherein each coreset configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS is pre-defined in NR. Each coreset configuration is associated with a list of TCI (Transmission configuration indicator) states. One DL RS ID (SSB or CSI RS) is configured per TCI state. The list of TCI states corresponding to a coreset configuration is signaled by gNB via RRC signaling. One of the TCI state in TCI state list is activated and indicated to UE by gNB. TCI state indicates the DL TX beam (DL TX beam is QCLed with SSB/CSI RS of TCI state) used by GNB for transmission of PDCCH in the PDCCH monitoring occasions of a search space.

BWP operation in fifth generation wireless communication system: In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility);

and the subcarrier spacing can be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

Random access in fifth generation wireless communication system: In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by non-synchronized UE in RRC_CONNECTED state. Several types of random access procedure is supported.

Contention based random access (CBRA): This is also referred as 4 step CBRA. In this type of random access, the UE first transmits Random Access preamble (also referred as Msg1) and then waits for Random access response (RAR) in the RAR window. RAR is also referred as Msg2. Next generation node B (gNB) transmits the RAR on physical downlink shared channel (PDSCH). PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by the gNB. The RA-RNTI is calculated as follows:

RA-RNTI=1+s_id+14*t_id+14*80*f_id+14*80*8*ul_carrier_id, where s_id is the index of the first orthogonal frequency division multiplexing (OFDM) symbol of the PRACH occasion where UE has transmitted Msg1, i.e. RA preamble; $0 \le s\_id \le 14$; t_id is the index of the first slot of the PRACH occasion ($0 \le t\_id < 80$); f_id is the index of the PRACH occasion within the slot in the frequency domain ($0 \le f\_id < 8$), and ul_carrier_id is the UL carrier used for Msg1 transmission (0 for normal UL (NUL) carrier and 1 for supplementary UL (SUL) carrier.

Several RARs for various Random access preambles detected by the gNB can be multiplexed in the same RAR media access control (MAC) protocol data unit (PDU) by the gNB. An RAR in MAC PDU corresponds to UE's RA preamble transmission if the RAR includes an RA preamble identifier (RAPID) of the RA preamble transmitted by the UE. If the RAR corresponding to its RA preamble transmission is not received during the RAR window and the UE has not yet transmitted the RA preamble for a configurable (configured by the gNB in RACH configuration) number of times, the UE goes back to first step i.e. select random access resource (preamble/RACH occasion) and transmits the RA preamble. A backoff may be applied before going back to first step.

If the RAR corresponding to its RA preamble transmission is received, the UE transmits message 3 (Msg3) in UL grant received in RAR. The Msg3 includes message such as RRC connection request, RRC connection re-establishment request, RRC handover confirm, scheduling request, SI request etc. It may include the UE identity (i.e. cell-radio network temporary identifier (C-RNTI) or system architecture evolution (SAE)-temporary mobile subscriber identity (S-TMSI) or a random number). After transmitting the Msg3, the UE starts a contention resolution timer. While the contention resolution timer is running, if the UE receives a physical downlink control channel (PDCCH) addressed to C-RNTI included in the Msg3, the contention resolution is considered successful, the contention resolution timer is stopped and the RA procedure is completed. While the contention resolution timer is running, if the UE receives contention resolution MAC control element (CE) including the UE's contention resolution identity (first X bits of common control channel (CCCH) service data unit (SDU) transmitted in Msg3), the contention resolution is considered successful, contention resolution timer is stopped and RA procedure is completed. If the contention resolution timer expires and the UE has not yet transmitted the RA preamble for a configurable number of times, the UE goes back to first step i.e. select random access resource (preamble/RACH occasion) and transmits the RA preamble. A backoff may be applied before going back to first step.

Contention free random access (CFRA): This is also referred as legacy CFRA or 4 step CFRA. The CFRA procedure is used for scenarios such as handover where low latency is required, timing advance establishment for secondary cell (Scell), etc. Evolved node B (eNB) assigns to UE dedicated Random access preamble. The UE transmits the dedicated RA preamble. The eNB transmits the RAR on PDSCH addressed to RA-RNTI. The RAR conveys RA preamble identifier and timing alignment information. The RAR may also include UL grant. The RAR is transmitted in RAR window similar to contention based RA (CBRA) procedure. The CFRA is considered successfully completed after receiving the RAR including RA preamble identifier (RAPID) of RA preamble transmitted by the UE. In case RA is initiated for beam failure recovery, the CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such as handover and beam failure recovery, if dedicated preamble(s) are assigned to the UE, during first step of random access i.e. during random access resource selection for Msg1 transmission, the UE determines whether to transmit a dedicated preamble or a non-dedicated preamble. The dedicated preambles is typically provided for a subset of SSBs/CSI RSs. If there is no SSB/CSI RS having DL RSRP above a threshold amongst the SSBs/CSI RSs for which contention free random access resources (i.e. dedicated preambles/ROs) are provided by the gNB, the UE may select the non-dedicated preamble. Otherwise, the UE may select the dedicated preamble. Accordingly, during the RA procedure, one random access attempt can be CFRA while other random access attempt can be CBRA.

2 step contention based random access (2 step CBRA): In the first step, the UE transmits random access preamble on PRACH and a payload (i.e. MAC PDU) on a PUSCH. The random access preamble and payload transmission is also referred as MsgA. In the second step, after MsgA transmission, the UE monitors for a response from the network (i.e. gNB) within a configured window. The response is also referred as MsgB. Next generation node B (gNB) transmits the MsgB on physical downlink shared channel (PDSCH). PDCCH scheduling the PDSCH carrying MsgB is addressed to MsgB-radio network temporary identifier (MSGB-RNTI). The MSGB-RNTI identifies the time-frequency resource (also referred as physical RA channel (PRACH) occasion or PRACH transmission (TX) occasion or RA channel (RACH) occasion) in which RA preamble was detected by the gNB. The MSGB-RNTI is calculated as follows:

RA-RNTI=1+s_id+14*t_id+14*80*f_id+14*80*8*ul-_carrier_id+14×80×8×2, where s_id is the index of the first orthogonal frequency division multiplexing (OFDM) symbol of the PRACH occasion where UE has transmitted Msg1, i.e. RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

If CCCH SDU was transmitted in the MsgA payload, the UE performs contention resolution using the contention resolution information in the MsgB. The contention resolution is successful if the contention resolution identity received in the MsgB matches first 48 bits of the CCCH SDU transmitted in MsgA. If a C-RNTI was transmitted in the MsgA payload, the contention resolution is successful if the UE receives PDCCH addressed to the C-RNTI. If the contention resolution is successful, random access procedure is considered successfully completed. Instead of contention resolution information corresponding to the transmitted MsgA, the MsgB may include a fallback information corresponding to the random access preamble transmitted in the MsgA. If the fallback information is received, the UE transmits Msg3 and performs contention resolution using Msg4 as in CBRA procedure. If the contention resolution is successful, random access procedure is considered successfully completed. If the contention resolution fails upon fallback (i.e. upon transmitting Msg3), the UE retransmits MsgA. If configured window in which the UE monitors network response after transmitting the MsgA expires and the UE has not received MsgB including contention resolution information or fallback information as explained above, the UE retransmits MsgA. If the random access procedure is not successfully completed even after transmitting the msgA configurable number of times, the UE fallbacks to 4 step RACH procedure i.e. UE only transmits the PRACH preamble.

The MsgA payload may include one or more of common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI MAC CE, or padding. The MsgA may include UE ID (e.g. random ID, S-TMSI, C-RNTI, resume ID, etc.) along with preamble in first step. The UE ID may be included in the MAC PDU of the MsgA. The UE ID such as C-RNTI may be carried in MAC CE wherein the MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which the UE performs the RA procedure. When the UE performs RA after power on (before it is attached to the network), then the UE ID is the random ID. When the UE performs RA in IDLE state after it is attached to network, the UE ID is S-TMSI. If the UE has an assigned C-RNTI (e.g. in connected state), the UE ID is C-RNTI. In case where the UE is in INACTIVE state, the UE ID is resume ID. In addition to the UE ID, additional control (ctrl) information can be sent in the MsgA. The control information may be included in the MAC PDU of the MsgA. The control information may include one or more of connection request indication, connection resume request indication, SI request indication, buffer status indication, beam information (e.g. one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): In this case, the gNB assigns to the UE dedicated Random access preamble(s) and PUSCH resource(s) for MsgA transmission. RO(s) to be used for preamble transmission may also be indicated. In the first step, the UE transmits random access preamble on PRACH and a payload on PUSCH using the contention free random access resources (i.e. dedicated preamble/PUSCH resource/RO). In the second step, after MsgA transmission, the UE monitors for a response from the network (i.e. gNB) within a configured window. The response is also referred as MsgB.

Next generation node B (gNB) transmits the MsgB on physical downlink shared channel (PDSCH). PDCCH scheduling the PDSCH carrying the MsgB is addressed to MsgB-radio network temporary identifier (MSGB-RNTI). The MSGB-RNTI identifies the time-frequency resource (also referred as physical RA channel (PRACH) occasion or PRACH transmission (TX) occasion or RA channel (RACH) occasion) in which RA preamble was detected by the gNB. The MSGB-RNTI is calculated as follows: RA-RNTI=1+s_id+14*t_id+14*80*f_id+14*80*8*ul_carrier_id+14×80×8×2, where s_id is the index of the first orthogonal frequency division multiplexing (OFDM) symbol of the PRACH occasion where UE has transmitted Msg1, i.e. RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

If the UE receives PDCCH addressed to C-RNTI, random access procedure is considered successfully completed. If the UE receives fallback information corresponding to its transmitted preamble, random access procedure is considered successfully completed.

For certain events such as handover and beam failure recovery, if dedicated preamble(s) and PUSCH resource(s) are assigned to the UE, during first step of random access i.e.

during random access resource selection for MsgA transmission, the UE determines whether to transmit dedicated preamble or non=dedicated preamble. Dedicated preambles is typically provided for a subset of SSBs/CSI RSs. If there is no SSB/CSI RS having DL RSRP above a threshold amongst the SSB s/CSI RSs for which contention free random access resources (i.e. dedicated preambles/ROs/PUSCH resources) are provided by the gNB, the UE may select the non-dedicated preamble. Otherwise, the UE may select the dedicated preamble. Accordingly, during the RA procedure, one random access attempt can be 2 step CFRA while other random access attempt can be 2 step CBRA.

Upon initiation of random access procedure, the UE first selects the carrier (SUL or NUL). If the carrier to be used for the Random Access procedure is explicitly signalled by the gNB, the UE may select the signalled carrier for performing Random Access procedure. If the carrier to be used for the Random Access procedure is not explicitly signalled by the gNB, the Serving Cell for the Random Access procedure is configured with supplementary uplink and the RSRP of the downlink pathloss reference is less than rsrp-ThresholdSSB-SUL, the UE may select the SUL carrier for performing Random Access procedure. Otherwise, the UE may select the NUL carrier for performing Random Access procedure. Upon selecting the UL carrier, the UE determines the UL and DL BWP for the random access procedure as specified in section 5.15 of TS 38.321. The UE then determines whether to perform 2 step or 4 step RACH for this random access procedure.

- If this random access procedure is initiated by PDCCH order and if the ra-PreambleIndex explicitly provided by PDCCH is not 0b000000, the UE selects 4 step RACH.
- else if 2 step contention free random access resources are signaled by the gNB for this random access procedure, the UE selects 2 step RACH.
- else if 4 step contention free random access resources are signaled by the gNB for this random access procedure, the UE selects 4 step RACH.
- else if the UL BWP selected for this random access procedure is configured with only 2 step RACH resources, the UE selects 2 step RACH.
- else if the UL BWP selected for this random access procedure is configured with only 4 step RACH resources, UE selects 4 step RACH.
- else if the UL BWP selected for this random access procedure is configured with both 2 step and 4 step RACH resources,
  - if RSRP of the downlink pathloss reference is below a configured threshold, the UE selects 4 step RACH. Otherwise the UE selects 2 step RACH.

Small data transmission in fifth generation wireless communication system: In 5G wireless communication system, small data transmission (SDT) in RRC_INACTIVE is supported. The uplink data can be transmitted in Msg3 in case of 4 step RA procedure and in MsgA in case of 2 step RA procedure.

FIG. 1 illustrates a signaling flow for small data transmission using 4 step RA.

Criteria to initiate 4 step RA for SDT are met. The UE may select preamble/RO (PRACH occasion) from among preambles/ROs for the SDT.

In step 101, the UE may transmit, to the gNB, a random access preamble.

In step 103, the UE may receive an RAR including UL grant for Msg3 transmission.

In step 105, the may UE send an RRCResumeRequest or RRCResumeRequest1 to the gNB (same as the last serving GNB) on SRB 0. The RRCResumeRequest or RRCResumeRequest1 includes full/short I-RNTI (resumeIdentity), the resume cause (resumeCause), and an authentication token (resumeMAC-I).

The I-RNTI (short or full I-RNTI) is used for context identification and a value of the I-RNTI used for the context identification shall be the same as a value of the I-RNTI that the UE had received from the last serving gNB in the RRCRelease with suspendConfig message.

The ResumeMAC-I is a 16-bit message authentication token. The UE shall calculate a value of the ResumeMAC-I using the integrity algorithm (NIA (New Radio integrity protection algorithm) or EIA (EPS integrity algorithm)) in the stored AS (access stratum) security context, which was negotiated between the UE and the last serving gNB and the $K_{RRcint}$ from the stored AS security context with the following inputs:

- KEY: it shall be set to current $K_{RRcint}$;
- BEARER: all its bits shall be set to 1;
- DIRECTION: its bit shall be set to 1;
- COUNT: all its bits shall be set to 1; and
- MESSAGE: it shall be set to VarResumeMAC-Input with following inputs:
  - source PCI (set to the physical cell identity of the PCell the UE was connected to prior to suspension of the RRC connection)
  - target Cell-ID (Set to the cellIdentity of the first PLMN-Identity included in the PLMN-IdentityInfoList broadcasted in SIB1 of the target cell i.e. the cell to which the UE is sending small data)
  - source C-RNTI (Set to C-RNTI that the UE had in the PCell it was connected to prior to suspension of the RRC connection).

The UE may resume SRB(s)(signaling radio bearer(s)) and DRB(s)(data radio bearer(s)) and may derive new security keys using the NextHopChainingCount provided in the RRCRelease message of the previous RRC connection and may re-established the AS security. The user data is ciphered and integrity protected (Only for DRBs configured with UP integrity protection) and transmitted on DTCH multiplexed with the RRCResumeRequestIRRCResumeRequest1 message on CCCH/CCCH1.

In step 107, the gNB may validate the resumeMAC-I and may deliver the uplink data to UPF (user plane function).

In step 109, the gNB may transmit, to the UE, the RRCRelease message to keep the UE in RRC_INACTIVE along with contention Resolution Identity. PDCCH is addressed to TC-RNTI. If downlink data is available, the downlink data is sent ciphered and integrity protected (Only for DRBs configured with UP integrity protection) on DTCH multiplexed with the RRCRelease message on DCCH.

In an embodiment, the gNB may decide not to send the RRCRelease message together with contention Resolution Identity. In this case, upon completion of random access, the UE may monitor PDCCH addressed to C-RNTI. UL/DL data can be exchanged between UE and gNB until RRCRelease message is received or SDT procedure is terminated.

FIG. 2 illustrates a signaling flow for small data transmission using 2 step RA.

Criteria to initiate 2 step RA for SDT are met. The UE may select preamble/RO/PO (PUSCH occasion) from among preambles/ROs/POs for SDT. In step 201, the UE may transmit random access preamble.

In the MsgA payload, in step 203, the UE may send an RRCResumeRequest or RRCResumeRequest) to the gNB (same as the last serving GNB) on SRB 0. The RRCResumeRequest or RRCResumeRequest) includes full/short I-RNTI (resumeIdentity), the resume cause (resumeCause), and an authentication token (resume-MAC-I).

The I-RNTI (short or full I-RNTI) is used for context identification and a value of the I-RNTI shall be the same as a value of the I-RNTI that the UE had received from the last serving gNB in the RRCRelease with suspendConfig message.

The ResumeMAC-I is a 16-bit message authentication token, the UE shall calculate a value of the ResumeMAC-I using the integrity algorithm (NIA or EIA) in the stored AS security context, which was negotiated between the UE and the last serving gNB and the $K_{RRCint}$ from the stored AS security context with the following inputs:

KEY: it shall be set to current $K_{RRCint}$,
BEARER: all its bits shall be set to 1;
DIRECTION: its bit shall be set to 1;
COUNT: all its bits shall be set to 1; and
MESSAGE: it shall be set to VarResumeMAC-Input with following inputs:
source PCI (set to the physical cell identity of the PCell the UE was connected to prior to suspension of the RRC connection)
target Cell-ID (Set to the cellIdentity of the first PLMN-Identity included in the PLMN-IdentityInfoList broadcasted in SIB1 of the target cell i.e. the cell to which the UE is sending small data)
source C-RNTI (Set to C-RNTI that the UE had in the PCell it was connected to prior to suspension of the RRC connection).

The UE may resume all SRBs and DRBs, derive new security keys using the NextHopChainingCount provided in the RRCRelease message of the previous RRC connection and re-established the AS security. The user data is ciphered and integrity protected (Only for DRBs configured with UP integrity protection) and transmitted on DTCH multiplexed with the RRCResumeRequest/RRCResumeRequest1 message on CCCH/CCCH1.

In step 205, the gNB may validate the resumeMAC-I and deliver the uplink data to UPF.

In step 207, the gNB may transmit, to the UE, the RRCRelease message to keep the UE in RRC_INACTIVE in MsgB along with successRAR. PDCCH is addressed to C-RNTI. If downlink data is available, the downlink data is sent ciphered and integrity protected (Only for DRBs configured with UP integrity protection) on DTCH multiplexed with the RRCRelease message on DCCH.

In an embodiment, the gNB may decide not to send the RRCRelease message together with successRAR. In this case upon completion of random access, the UE may monitor PDCCH addressed to C-RNTI. UL/DL data can be exchanged between the UE and the gNB until RRCRelease message is received or SDT procedure is terminated.

FIG. 3 illustrates a signaling flow for small data transmission using preconfigured PUSCH resource.

Criteria to initiate SDT using preconfigured PUSCH resources are met.

In the preconfigured PUSCH resource, in step 301, the UE may send an RRCResumeRequest or RRCResumeRequest1 to the gNB (same as the last serving GNB) on SRB 0. The RRCResumeRequest or RRCResumeRequest1 includes full/short I-RNTI (resumeIdentity), the resume cause (resumeCause), and an authentication token (resumeMAC-I). The I-RNTI (short or full I-RNTI) is used for context identification and a value of the I-RNTI shall be the same as a value of the I-RNTI that the UE had received from the last serving gNB in the RRCRelease with suspendConfig message. The ResumeMAC-I is a 16-bit message authentication token and the UE shall calculate a value of the Resume-MAC-I using the integrity algorithm (NIA or EIA) in the stored AS security context, which was negotiated between the UE and the last serving gNB and the $K_{RRCint}$ from the stored AS security context with the following inputs:

KEY: it shall be set to current $K_{RRCint}$,
BEARER: all its bits shall be set to 1;
DIRECTION: its bit shall be set to 1;
COUNT: all its bits shall be set to 1; and
MESSAGE: it shall be set to VarResumeMAC-Input with following inputs:
source PCI (set to the physical cell identity of the PCell the UE was connected to prior to suspension of the RRC connection)
target Cell-ID (Set to the cellIdentity of the first PLMN-Identity included in the PLMN-IdentityInfoList broadcasted in SIB1 of the target cell i.e. the cell to which the UE is sending small data)
source C-RNTI (Set to C-RNTI that the UE had in the PCell it was connected to prior to suspension of the RRC connection).

The UE may resume all SRBs and DRBs, derive new security keys using the NextHopChainingCount provided in the RRCRelease message of the previous RRC connection and re-establish the AS security. The user data is ciphered and integrity protected (Only for DRBs configured with UP integrity protection) and transmitted on DTCH multiplexed with the RRCResumeRequestIRRCResumeRequest1 message on CCCH.

The UE can alternately transmit its small data by using one of the following options:

RRCResumeRequest (or new RRC message). resumeIdentity, ResumeMAC-I, resumeCause, NAS container in RRCResumeRequest/RRCResumeRequest1. NAS container includes UL data.
new MAC CE (resumeIdentity, ResumeMAC-I)+uplink data (on DTCH). resumeIdentity is provided for UE identification purpose. ResumeMAC-I is for security In step 303, the gNB may validate the resumeMAC-I and deliver the uplink data to UPF.

In step 305, the gNB may transmit, to the UE, the RRCRelease message to keep the UE in RRC_INACTIVE. The PDCCH is addressed to C-RNTI. The C-RNTI is the one which the UE used in cell from which it received preconfigured PUSCH resources. Alternately, the C-RNTI can be assigned along with preconfigured PUSCH resources. If downlink data is available, the downlink data is sent ciphered and integrity protected (Only for DRBs configured with UP integrity protection) on DTCH multiplexed with the RRCRelease message on DCCH.

(Alternate 1) In an embodiment, an alternate signaling flow is provided, where the gNB can schedule UL grant (PDCCH addressed to C-RNTI) before RRCRelease. In the UL transmission, the UE can indicate if it has more data to transmit. If UE has more data to transmit, the gNB can schedule UL grant. Otherwise RRCRelease. In the UL transmission, the UE can also include SSB ID(s) of SSB above threshold if the SSB indicated by PRACH preamble is no longer suitable.

(Alternate 2) Alternately, the gNB can transmit PDCCH addressed to RNTI (i.e. RNTI is the one assigned by the gNB along with preconfigured resource, it can be assigned to other UEs as well) and scheduled DL TB includes contention resolution identity (it is first X bits (e.g. 48 bits)

of resume message) and C-RNTI. If it matches with UE's contention resolution identity, the UE may stop the monitoring timer and the UE can consider small data transmission as successful.

In the response of the small data transmission, the UE can receive a signal (RRC message or DCI) for the following purpose: releasing pre-configured PUSCH or switching to Resume procedure (i.e. RRC_CONNECTED).

Mobility in RRC_INACTIVE in fifth generation wireless communication system: RRC_INACTIVE is a state where a UE remains in CM-CONNECTED and can move within an area configured by NG-RAN (the RNA) without notifying NG-RAN. In the RRC_INACTIVE, the last serving gNB node keeps the UE context and the UE-associated NG connection with the serving AMF and UPF.

If the last serving gNB receives DL data from the UPF or DL UE-associated signaling from the AMF (except the UE Context Release Command message) while the UE is in the RRC_INACTIVE, the last serving gNB may page in the cells corresponding to the RNA and may send XnAP RAN Paging to neighbor gNB(s) if the RNA includes cells of neighbor gNB(s).

A UE in the RRC_INACTIVE state is required to initiate RNA update procedure when it moves out of the configured RNA. When receiving RNA update request from the UE, the receiving gNB triggers the XnAP Retrieve UE Context procedure to get the UE context from the last serving gNB and may decide to send the UE back to RRC_INACTIVE state, move the UE into RRC_CONNECTED state, or send the UE to RRC_IDLE.

At transition to RRC_INACTIVE, the NG-RAN node may configure the UE with a periodic RNA Update timer value (T380). In case of periodic RNA update, if the last serving gNB decides not to relocate the UE context, the NG-RAN node fails the Retrieve UE Context procedure and sends the UE back to RRC_INACTIVE, or to RRC_IDLE directly by an encapsulated RRCRelease message.

UE stops the timer T380 upon reception of RRCSetup message, RRCRelease message, RRCResume message from the gNB. If T380 expires, the UE initiates RRC Connection resume procedure. During the RRC Connection resume procedure, the UE first checks whether access attempt is barred or not. If the access attempt is barred, the UE sets the variable pendingRNA-Update to true and starts the timer T390 for UE's access category. If the access attempt is not barred, the UE transmits RRCResumeRequest or an RRCResumeRequest1 to the gNB with resume cause set to RNA update and sets the variable pendingRNA-Update to false. If RRCReject is received from the gNB in response to an RRCResumeRequest or an RRCResumeRequest1, the UE sets the variable pendingRNA-Update to true and starts the timer T302. When the UE enters RRC_IDLE, the UE may set the variable pendingRNA-Update to false, if that is set to true.

If timer T302 expires or is stopped:

for each Access Category for which T390 is not running: consider the barring for this Access Category to be alleviated:

else if timer T390 corresponding to an Access Category other than '2' expires or is stopped, and if timer T302 is not running: consider the barring for this Access Category to be alleviated;

else if timer T390 corresponding to the Access Category '2' expires or is stopped: consider the barring for this Access Category to be alleviated;

When barring is alleviated for Access Category '8' or Access Category '2':

if upper layers do not request RRC the resumption of an RRC connection, and if the variable pendingRNA-Update is set to true:

UE initiate RRC connection resume procedure with resumeCause value set to rna-Update.

Issues:

In RRC_INACTIVE state, when data becomes available for one or more radio bearers configured for SDT, the UE checks whether SDT criteria are met (RSRP threshold, data volume threshold, etc.) or not. If the SDT criteria are met, SDT procedure is initiated. The UE transmits RRCResumeRequest+UL data in SDT resource (i.e. Msg3/MsgA/CG resource). BSR may also be included. In case of RA-SDT (random access-SDT) procedure, upon completion of RA procedure, the UE monitors for PDCCH addressed to C-RNTI for subsequent data transmission/reception. In case of CG-SDT (configured grant-SDT), upon transmitting RRCResumeRequest in CG resource, the UE monitors for PDCCH addressed to SDT-RNTI for subsequent data transmission/reception. The SDT procedure is completed upon receiving RRCRelease message from the gNB.

The issue is how to handle T380 expiry during the SDT procedure. It is proposed that T380 is stopped when resume procedure is initiated for the SDT. Alternately, T380 is not stopped when the resume procedure is initiated for the SDT and upon expiry of T380, the UE cancels RNA update if SDT procedure is ongoing. This would delay the RNA update procedure. Some enhancement is needed.

Embodiment 1

UE is in RRC_CONNECTED state.

The UE receives RRCRelease message from the gNB. The RRCRelease message includes suspend configuration. The RRCRelease message includes value of timer T380.

The UE enters RRC_INACTIVE state upon receiving RRCRelease message with suspend configuration.

The UE starts the timer T380 as value of timer T380 is included in the received RRCRelease message.

Upon expiring of T380 or upon reception of RRC Reject message, the UE checks whether SDT procedure is ongoing or not (alternately the UE checks whether SDT timer (also referred as SDT error detection timer) is running or not). If the SDT procedure is ongoing (or if the SDT timer is running), the UE sets a parameter pendingRNA-Update to True (or alternately, the UE sets pendingRNA-Update to True, if it is False), UE does not trigger RRC connection resume procedure for RNA update. If the SDT procedure is not ongoing (or if the SDT timer is not running), UE triggers RRC connection resume procedure for RNA update.

While in the RRC_INACTIVE state, when data arrives for one or more RB(s) and criteria to initiate SDT procedure (e.g. RSRP threshold, data volume threshold, etc.) are met, the UE may select one of RA-SDT or CG-SDT procedure as explained in the disclosure.

If RA-SDT is selected:

Upon completion of random access procedure or upon successful contention resolution (criteria for completion of random access procedure or contention resolution are as explained earlier in the background); or Upon reception of PDCCH addressed to C-RNTI from gNB; or Upon reception of RRC message or DCCH SDU from gNB:

the UE sets the pendingRNA-Update to FALSE, if it is TRUE; or (Alternate) the UE sets the pendingRNA-Update to FALSE, if it was set to TRUE due to expiry of T380 during the SDT procedure.

Else If CG SDT is selected:

Upon receiving the acknowledgment (e.g. HARQ feedback, RLC ACK, L1 ACK) after first UL packet transmitted in CG resource during the SDT procedure; or Upon receiving the first PDCCH addressed to C-RNTI (or SDT-RNTI); or Upon reception of RRC message or DCCH SDU (dedicated control channel service data unit) from the gNB:

the UE sets the pendingRNA-Update to FALSE, if it is TRUE; or (Alternate) the UE sets the pendingRNA-Update to FALSE, if it was set to TRUE due to expiry of T380 during the SDT procedure.

Upon abnormal termination (e.g. if SDT timer expires during SDT procedure, if cell reselection occurs during SDT procedure, if integrity check fails for the packet received from the gNB during SDT procedure, or cell quality goes below a threshold or the gNB indicates the UE to terminate SDT procedure or if there is no suitable (above a threshold) SSB available or if there is no suitable (above a threshold) SSB available for which CG resources are configured and SDT procedure is CG-SDT) of the SDT procedure:

the UE checks the flag pendingRNA-Update. If pendingRNA-Update is set to TRUE, UE initiate RRC connection resume procedure with resumeCause set to rna-Update;

(Alternate) UE checks if T380 was expired during SDT procedure or not. If T380 was expired during SDT procedure, the UE checks the flag pendingRNA-Update. If pendingRNA-Update is set to TRUE, the UE initiate RRC connection resume procedure with resumeCause set to rna-Update; or (Alternate) If pendingRNA-Update is set to TRUE due to expiry of T380 during the SDT procedure, the UE may initiate RRC connection resume procedure with resumeCause set to rna-Update.

Upon arrival of data only for RB(s) for which the SDT is enabled, the high level procedure for selection between the SDT and non-SDT procedure is as follows:

If CG-SDT criteria are met:

The UE selects CG-SDT. The UE may initiate SDT procedure

Else if RA-SDT criteria are met:

The UE selects RA-SDT. The UE may initiate SDT procedure

Else:

The UE may initiate the non-SDT procedure.

Criteria for selecting CG-SDT: CG-SDT criteria are considered met, if all of the following conditions are met, 1) available data volume is less than or equal to data volume threshold (data volume threshold is signaled by the gNB and can be specific to CG-SDT or common for CG-SDT and RA-SDT)

2) RSRP (cell quality or RSRP of path loss reference) is greater than or equal to a configured threshold (threshold is signaled by the gNB and can be specific to CG-SDT or common for CG-SDT and RA-SDT)

3) CG-SDT resources are configured on the selected UL carrier and are valid (e.g. TA is valid (TAT-SDT timer is running), UE's cell is the same as the cell from which CG resources are received)

Criteria for selecting RA-SDT: RA-SDT criteria are considered met, if all of the following conditions are met 1) available data volume is less than or equal to data volume threshold (data volume threshold is signaled by the gNB and can be specific to CG-SDT or common for CG-SDT and RA-SDT).

2) RSRP is greater than or equal to a configured threshold (threshold is signaled by the gNB and can be specific to CG-SDT or common for CG-SDT and RA-SDT)

3) 4 step RA-SDT resources are configured on the selected UL carrier and criteria to select 4 step RA SDT are met; or 2 step RA-SDT resources are configured on the selected UL carrier and criteria to select 2 step RA SDT are met.

Note:

The UE checks the condition 1) and 2) before UL carrier selection and RA-Type selection.

For RA-SDT, if SUL is configured in the cell, UL carrier is selected based on RSRP threshold (threshold is signaled by gNB and can be specific to CG-SDT or common for CG-SDT and RA-SDT)

RA type (2 step or 4 step) selection is performed based on RSRP threshold (threshold is signaled by the gNB and can be the same for SDT and non-SDT RACH) as explained earlier in the disclosure.

Embodiment 2

The UE is in RRC_CONNECTED state.

The UE receives RRCRelease message from the gNB. The RRCRelease message includes suspend configuration. The RRCRelease message includes value of timer T380.

The UE enters RRC_INACTIVE state upon receiving the RRCRelease message with the suspend configuration.

The UE starts the timer T380 as value of timer T380 is included in the received RRCRelease message.

Upon expiring of T380, the UE checks whether the SDT procedure is ongoing or not (alternately the UE checks whether SDT timer (also referred as SDT error detection timer) is running or not). If the SDT procedure is ongoing (or if the SDT timer is running):

the UE sets pendingRNA-Update to True (or alternately, the UE sets pendingRNA-Update to True, if it is False). UE does not trigger RRC connection resume procedure for RNA update. If the SDT procedure is not ongoing (or if the SDT timer is not running), UE triggers RRC connection resume procedure for RNA update.

While in RRC_INACTIVE state, when data arrives for one or more RB(s) and criteria to initiate SDT procedure (e.g. RSRP threshold, data volume threshold, etc.) are met, the UE may select one of RA-SDT or CG-SDT procedure as explained in the disclosure.

Upon reception of RRC message or DCCH SDU from the gNB during the SDT procedure:

The UE sets the pendingRNA-Update to FALSE, if it is TRUE; or (Alternate) The UE sets the pendingRNA-Update to FALSE, if it was set to TRUE due to expiry of T380 during the SDT procedure.

Upon abnormal termination (e.g. if SDT timer expires during the SDT procedure, if cell reselection occurs during SDT procedure, if integrity check fails for the packet received from the gNB during SDT procedure, or cell quality goes below a threshold or the gNB indicates the UE to terminate the SDT procedure or if there is no suitable (above a threshold) SSB available or if there is no suitable (above a threshold) SSB available for which CG resources are configured and SDT procedure is CG-SDT) of the SDT procedure:

The UE checks the flag pendingRNA-Update. If pendingRNA-Update is set to TRUE, the UE may initiate RRC connection resume procedure with resumeCause set to rna-Update;

(Alternate) The UE checks if T380 was expired during the SDT procedure or not. If T380 was expired during the SDT procedure, the UE checks the flag pendingRNA-Update. If pendingRNA-Update is set to TRUE, the UE may initiate RRC connection resume procedure with resumeCause set to rna-Update; or (Alternate) If pendingRNA-Update is set to TRUE due to expiry of T380 during the SDT procedure, the UE may initiate RRC connection resume procedure with resumeCause set to rna-Update.

Upon arrival of data only for RB(s) for which SDT is enabled, the high level procedure for selection between SDT and non-SDT procedure is as follows:

If CG-SDT criteria are met:

The UE selects CG-SDT. The UE may initiate SDT procedure.

Else if RA-SDT criteria are met:

The UE selects RA-SDT. The UE may initiate SDT procedure.

Else:

The UE may initiate the non-SDT procedure.

Criteria for selecting CG-SDT: CG-SDT criteria are considered met, if all of the following conditions are met, 1) available data volume is less than or equal to data volume threshold (data volume threshold is signaled by the gNB and can be specific to CG-SDT or common for CG-SDT and RA-SDT).
2) RSRP (cell quality or RSRP of path loss reference) is greater than or equal to a configured threshold (threshold is signaled by the gNB and can be specific to CG-SDT or common for CG-SDT and RA-SDT).
3) CG-SDT resources are configured on the selected UL carrier and are valid (e.g. TA is valid (TAT-SDT timer is running), UE's cell is the same as the cell from which CG resources are received).

Criteria for selecting RA-SDT: RA-SDT criteria are considered met, if all of the following conditions are met.

1) available data volume is less than or equal to data volume threshold (data volume threshold is signaled by the gNB and can be specific to CG-SDT or common for CG-SDT and RA-SDT).
2) RSRP is greater than or equal to a configured threshold (threshold is signaled by the gNB and can be specific to CG-SDT or common for CG-SDT and RA-SDT).
3) 4 step RA-SDT resources are configured on the selected UL carrier and criteria to select 4 step RA SDT are met; or 2 step RA-SDT resources are configured on the selected UL carrier and criteria to select 2 step RA SDT are met.

Note:

The UE checks the condition 1) and 2) before UL carrier selection and RA-Type selection.

For RA-SDT, if SUL is configured in the cell, UL carrier is selected based on RSRP threshold (threshold is signaled by the gNB and can be specific to CG-SDT or common for CG-SDT and RA-SDT)

RA type (2 step or 4 step) selection is performed based on RSRP threshold (threshold is signaled by the gNB and can be the same for SDT and non-SDT RACH) as explained earlier in the disclosure.

Embodiment 3

The UE is in RRC_CONNECTED state.

The UE receives RRCRelease message from the gNB. The RRCRelease message includes suspend configuration. The RRCRelease message includes value of timer T380.

The UE enters RRC_INACTIVE state upon receiving the RRCRelease message with suspend configuration.

The UE starts the timer T380 as value of timer T380 is included in the received RRCRelease message.

While in RRC_INACTIVE state, when data arrives for one or more RB(s) and criteria to initiate SDT procedure (e.g. RSRP threshold, data volume threshold, etc.) are met, the UE may select one of RA-SDT or CG-SDT procedure as explained earlier. Upon initiation of the SDT procedure, the UE stops the timer T 380.

T380 is restarted upon successful completion of SDT procedure.

Alternatively, T380 is restarted upon reception of RRCRelease during the SDT procedure.

Alternatively, T380 is restarted upon abnormal termination of SDT procedure (e.g. if SDT timer expires during SDT procedure, if cell reselection occurs during SDT procedure, if integrity check fails for the packet received from the gNB during SDT procedure, or cell quality goes below a threshold or the gNB indicates UE to terminate SDT procedure or if there is no suitable (above a threshold) SSB available or if there is no suitable (above a threshold) SSB available for which CG resources is configured and SDT procedure is CG-SDT).

Embodiment 4

The UE is in RRC_CONNECTED state.

The UE receives RRCRelease message from the gNB. The RRCRelease message includes suspend configuration. The RRCRelease message includes value of timer T380.

The UE enters RRC_INACTIVE state upon receiving RRCRelease message with the suspend configuration.

The UE starts the timer T380 as value of timer T380 is included in the received RRCRelease message. Note that T380 is stopped when SDT procedure is started.

If T380 expires, the UE initiates RRC Connection resume procedure. During the RRC Connection resume procedure, the UE first checks whether access attempt is barred or not. If the access attempt is barred, the UE sets the variable pendingRNA-Update to true and starts the timer T390 for UE's access category. If the access attempt is not barred, the UE transmits RRCResumeRequest or an RRCResumeRequest1 to the gNB with resume cause set to RNA update and sets the variable pendingRNA-Update to false. If RRCReject is received from the gNB in response to an RRCResumeRequest or an RRCResumeRequest1, the UE sets the variable pendingRNA-Update to true and starts the timer T302. When UE enters RRC_IDLE, set the variable pendingRNA-Update to false, if that is set to true.

While in RRC_INACTIVE state, when data arrives for one or more RB(s) and criteria to initiate SDT procedure (e.g. RSRP threshold, data volume threshold, etc.) are met, the UE initiates the SDT procedure. It is possible that when SDT procedure is started T390 and/or T302 is running and pendingRNA-Update is set to true (access attempt for RNA update initiated before the SDT procedure is barred or RRCReject received from the gNB in response to an RRCResumeRequest or an RRCResumeRequest1 for RNA update initiated before the SDT procedure). As a result, RNA update may be triggered while SDT procedure is ongoing due to alleviation of barring as per below procedure:

If timer T302 expires or is stopped, for each Access Category for which T390 is not running, consider the barring for this Access Category to be alleviated;

else if timer T390 corresponding to an Access Category other than '2' expires or is stopped, and if timer T302 is not running, consider the barring for this Access Category to be alleviated;

else if timer T390 corresponding to the Access Category '2' expires or is stopped, consider the barring for this Access Category to be alleviated.

When barring is alleviated for Access Category '8' or Access Category '2':

if upper layers do not request RRC the resumption of an RRC connection; and if the variable pendingRNA-Update is set to true, The UE may initiate RRC connection resume procedure with resumeCause value set to rna-Update.

To avoid triggering of RNA update during SDT procedure, one of the following options can be considered:

Option 1:

If timer T302 expires or is stopped, for each Access Category for which T390 is not running, consider the barring for this Access Category to be alleviated;

else if timer T390 corresponding to an Access Category other than '2' expires or is stopped, and if timer T302 is not running, consider the barring for this Access Category to be alleviated;

else if timer T390 corresponding to the Access Category '2' expires or is stopped, consider the barring for this Access Category to be alleviated.

When barring is alleviated for Access Category '8' or Access Category '2':

if upper layers do not request RRC the resumption of an RRC connection; and if the variable pendingRNA-Update is set to true; and if SDT procedure is not ongoing (or if SDT timer is not running), The UE may initiate RRC connection resume procedure with resumeCause value set to rna-Update.

Option 2:

When the SDT procedure is initiated, the UE stops T380. The UE also sets the variable pendingRNA-Update to false (the variable pendingRNA-Update is set to false if it is true). Alternately, the UE also sets the variable pendingRNA-Update to false (the variable pendingRNA-Update is set to false if it is true) if T302 and/or T390 is running. Alternately, the UE also sets the variable pendingRNA-Update to false (the variable pendingRNA-Update is set to false if it is true) if T390 is running and access category is 2. Alternately, the UE also sets the variable pendingRNA-Update to false (the variable pendingRNA-Update is set to false if it is true) if T302 and T390 is running and access category is other than 2.

In accordance with an embodiment of the disclosure, a method performed by a terminal in a wireless communication system is provided. The method may comprise: receiving, from a base station, a radio resource control (RRC) release message including a parameter indicating a timer that triggers a radio access network based notification area (RNA) update; transitioning to an RRC inactive state and starting the timer, based on the RRC release message; in case that criteria for small data transmission (SDT) are met while the timer is running, transmitting, to the base station, an RRC resume request message for the SDT, wherein the timer is not stopped when the RRC resume request message is transmitted; and in case that the timer expires while the SDT is ongoing, setting a variable indicating whether the RNA update is pending, to a true value.

In an embodiment, wherein the method further comprises in case that an abnormal termination of the SDT occurs and the variable is set to the true value, initiating an RRC resume procedure with a resume cause set to the RNA update.

In an embodiment, wherein the method further comprises in case that an RRC message or dedicated control channel (DCCH) service data unit (SDU) is received from the base station during the SDT and the variable is set to the true value, setting the value to a false value.

In an embodiment, wherein the SDT corresponds to a random access (RA)-SDT, and wherein an RA procedure is initiated for the RA-SDT.

In an embodiment, the method further comprises in case that the RA procedure is completed and the variable is set to the true value, setting the value to a false value.

In an embodiment, wherein the method further comprises in case that a physical downlink control channel (PDCCH) addressed to a cell-radio network temporary identifier (C-RNTI) corresponding to the terminal is received from the base station and the variable is set to the true value, setting the value to a false value.

In an embodiment, wherein the SDT corresponds to a configured grant (CG)-SDT, and wherein one or more uplink (UL) packets are transmitted to the base station using a CG resource during the CG-SDT.

In an embodiment, wherein the method further comprises in case that an acknowledgement message is received after a first UL packet, among the one or more UL packets and the variable is set to the true value, is received from the base station, setting the value to a false value.

In an embodiment, wherein the method further comprises in case that a first PDCCH addressed to a C-RNTI or a SDT-RNTI corresponding to the terminal is received from the base station and the variable is set to the true value, setting the value to a false value.

In accordance with an embodiment of the disclosure, a terminal in a wireless communication system is provided. The terminal may comprise: a transceiver; and at least one processor coupled to the transceiver and configured to: receive, from a base station via the transceiver, a radio resource control (RRC) release message including a parameter indicating a timer that triggers a radio access network based notification area (RNA) update; transition to an RRC inactive state and starting the timer, based on the RRC release message; in case that criteria for small data transmission (SDT) are met while the timer is running, transmit, to the base station via the transceiver, an RRC resume request message for the SDT, wherein the timer is not stopped when the RRC resume request message is transmitted; and in case that the timer expires while the SDT is ongoing, set a variable indicating whether the RNA update is pending, to a true value.

In an embodiment, wherein the at least one processor is further configured to: in case that an abnormal termination of the SDT occurs and the variable is set to the true value, initiate an RRC resume procedure with a resume cause set to the RNA update.

In an embodiment, wherein the at least one processor is further configured to: in case that an RRC message or dedicated control channel (DCCH) service data unit (SDU) is received from the base station during the SDT and the variable is set to the true value, set the value to a false value.

In an embodiment, wherein the SDT corresponds to a random access (RA)-SDT, and wherein an RA procedure is initiated for the RA-SDT.

In an embodiment, wherein the at least one processor is further configured to: in case that the RA procedure is completed and the variable is set to the true value, set the value to a false value.

In accordance with an embodiment of the disclosure, a method performed by a base station in a wireless communication system is provided. The method may comprise: transmitting, to a terminal, a radio resource control (RRC) release message including a parameter indicating a timer that triggers a radio access network based notification area (RNA) update, wherein the terminal transitions to an RRC inactive state and the timer is started, based on the RRC release message; and in case that criteria for small data transmission (SDT) are met while the timer is running, receiving, from the terminal, an RRC resume request message for the SDT, wherein the timer is not stopped when the RRC resume request message is transmitted, and wherein in case that the timer expires while the SDT is ongoing, a variable indicating whether the RNA update is pending, is set to a true value.

FIG. 4 is a diagram illustrating a UE 400 according to an embodiment of the present disclosure.

Referring to the FIG. 4, the UE 400 may include a processor 410, a transceiver 420 and a memory 430. However, all of the illustrated components are not essential. The UE 400 may be implemented by more or less components than those illustrated in the FIG. 4. In addition, the processor 410 and the transceiver 420 and the memory 430 may be implemented as a single chip according to another embodiment.

The aforementioned components will now be described in detail.

The processor 410 may include one or more processors or other processing devices that control the proposed function, process, and/or method. Operation of the UE 400 may be implemented by the processor 410.

The transceiver 420 may be connected to the processor 410 and transmit and/or receive a signal. In addition, the transceiver 420 may receive the signal through a wireless channel and output the signal to the processor 410. The transceiver 420 may transmit the signal output from the processor 410 through the wireless channel.

The memory 430 may store the control information or the data included in a signal obtained by the UE 400. The memory 430 may be connected to the processor 410 and store at least one instruction or a protocol or a parameter for the proposed function, process, and/or method. The memory 430 may include read-only memory (ROM) and/or random access memory (RAM) and/or hard disk and/or CD-ROM and/or DVD and/or other storage devices.

FIG. 5 is a diagram illustrating a base station 500 according to an embodiment of the present disclosure.

Referring to the FIG. 5, the base station 500 may include a processor 510, a transceiver 520 and a memory 530. However, all of the illustrated components are not essential. The base station 500 may be implemented by more or less components than those illustrated in FIG. 5. In addition, the processor 510 and the transceiver 520 and the memory 530 may be implemented as a single chip according to another embodiment. The aforementioned components will now be described in detail.

The processor 510 may include one or more processors or other processing devices that control the proposed function, process, and/or method. Operation of the base station 500 may be implemented by the processor 510.

The transceiver 520 may be connected to the processor 510 and transmit and/or receive a signal. The signal may include control information and data. In addition, the transceiver 520 may receive the signal through a wireless channel and output the signal to the processor 510. The transceiver 520 may transmit a signal output from the processor 510 through the wireless channel.

The memory 530 may store the control information or the data included in a signal obtained by the base station 500. The memory 530 may be connected to the processor 510 and store at least one instruction or a protocol or a parameter for the proposed function, process, and/or method. The memory 530 may include read-only memory (ROM) and/or random access memory (RAM) and/or hard disk and/or CD-ROM and/or DVD and/or other storage devices.

Methods according to the claims of the disclosure or the various embodiments of the disclosure described in the specification may be implemented in hardware, software, or a combination of hardware and software.

When implemented in software, a computer-readable storage medium storing one or more programs (software modules) may be provided. One or more programs stored in the computer-readable storage medium are configured for execution by one or more processors in an electronic device. The one or more programs may include instructions that cause the electronic device to perform the methods in accordance with the claims of the disclosure or the various embodiments of the disclosure described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a Local Area Network (LAN), a wide area network (WAN), or a storage area network (SAN), or a combination thereof. The storage device may be connected to an apparatus performing the various embodiments of the disclosure through an external port. In addition, a separate storage device in the communication network may be connected to the apparatus performing the various embodiments of the disclosure.

In the various embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method performed by a terminal in a wireless communication system, the method comprising:

receiving, from a base station, a radio resource control (RRC) release message including timer related information associated with a radio access network based notification area (RNA) update procedure;

starting a timer T380, based on the timer related information, wherein the timer T380 is associated with triggering the RNA update procedure;

in case that criteria for a small data transmission (SDT) procedure are met while the timer T380 is running, transmitting, to the base station, an RRC resume request message for the SDT procedure, wherein the timer T380 is not stopped when the RRC resume request message is transmitted;

in case that the timer T380 expires, identifying whether the SDT procedure is ongoing;

in case that the SDT procedure is ongoing, setting a variable pendingRNA-Update to true, wherein the variable pendingRNA-Update indicates whether there is a pending RNA update procedure or not; and in case that the SDT procedure is terminated, initiating an RRC connection resume procedure with resumeCause set to rna-Update, based on the variable pendingRNA-Update being set to true.

2. The method of claim 1, further comprising:

in case that an RRC message or dedicated control channel (DCCH) service data unit (SDU) is received from the base station during the SDT procedure and the variable pendingRNA-Update is set to true, setting the variable pendingRNA-Update to false.

3. The method of claim 1, wherein the SDT procedure corresponds to a random access (RA)-SDT, and wherein an RA procedure is initiated for the RA-SDT.

4. The method of claim 3, further comprising:

in case that the RA procedure is completed and the variable pendingRNA-Update is set to true, setting the variable pendingRNA-Update to false.

5. The method of claim 3, further comprising:

in case that a physical downlink control channel (PDCCH) addressed to a cell-radio network temporary identifier (C-RNTI) corresponding to the terminal is received from the base station and the variable pendingRNA-Update is set to true, setting the variable pendingRNA-Update to false.

6. The method of claim 1, wherein the SDT procedure corresponds to a configured grant (CG)-SDT, and wherein one or more uplink (UL) packets are transmitted to the base station by using a CG resource during the CG-SDT.

7. The method of claim 6, further comprising:

in case that an acknowledgement message is received after a first UL packet, among the one or more UL packets, is received from the base station, and the variable pendingRNA-Update is set to true, setting the variable pendingRNA-Update to false.

8. The method of claim 6, further comprising:

in case that a first PDCCH addressed to a C-RNTI or an SDT-RNTI corresponding to the terminal is received from the base station and the variable pendingRNA-Update is set to true, setting the variable pendingRNA-Update to false.

9. A terminal in a wireless communication system, the terminal comprising:

at least one transceiver;

at least one processor communicatively coupled to the at least one transceiver; and at least one memory, communicatively coupled to the at least one processor, storing instructions executable by the at least one processor to cause the terminal to:

receive, from a base station, a radio resource control (RRC) release message including timer related information associated with a radio access network based notification area (RNA) update procedure;

start a timer T380, based on the timer related information, wherein the timer T380 is associated with triggering the RNA update procedure;

in case that criteria for a small data transmission (SDT) procedure are met while the timer T380 is running, transmit, to the base station, an RRC resume request message for the SDT procedure, wherein the timer T380 is not stopped when the RRC resume request message is transmitted;

in case that the timer T380 expires, identify whether a small data transmission (SDT) procedure is ongoing;

in case that the SDT procedure is ongoing, set a variable pendingRNA-Update to true, wherein the variable pendingRNA-Update indicates whether there is a pending RNA update procedure or not; and in case that the SDT procedure is terminated, initiate an RRC connection resume procedure with resumeCause set to rna-Update, based on the variable pendingRNA-Update being set to true.

10. The terminal of claim 9, wherein the at least one processor terminal is further caused to:

in case that an RRC message or dedicated control channel (DCCH) service data unit (SDU) is received from the base station during the SDT procedure and the variable pendingRNA-Update is set to true, set the variable pendingRNA-Update to false value.

11. The terminal of claim 9, wherein the SDT procedure corresponds to a random access (RA)-SDT, and wherein an RA procedure is initiated for the RA-SDT.

12. The terminal of claim 11, wherein the terminal is further caused to:

in case that the RA procedure is completed and the variable pendingRNA-Update is set to true, set the variable pendingRNA-Update to false.

13. One or more non-transitory computer-readable storage media storing computer-executable instructions that, when executed by at least one processor of a terminal, cause the terminal to perform operations, the operations comprising:

receiving, from a base station, a radio resource control (RRC) release message including timer related information associated with a radio access network based notification area (RNA) update procedure;

starting a timer T380, based on the timer related information, wherein the timer T380 is associated with triggering the RNA update procedure;

in case that criteria for a small data transmission (SDT) procedure are met while the timer T380 is running, transmitting, to the base station, an RRC resume request message for the SDT procedure, wherein the timer T380 is not stopped when the RRC resume request message is transmitted;

in case that the timer T380 expires, identifying whether the SDT procedure is ongoing;

in case that the SDT procedure is ongoing, setting a variable pendingRNA-Update to true, wherein the variable pendingRNA-Update indicates whether there is a pending RNA update procedure or not; and in case that the SDT procedure is terminated, initiating an RRC connection resume procedure with resumeCause set to rna-Update, based on the variable pendingRNA-Update being set to true.

* * * * *